INVENTOR.
JON LODE
BY
James Aiken
Attorney.

Sept. 30, 1958 J. LODE 2,854,632

PHASE SEQUENCE SEGREGATING NETWORK

Filed May 14, 1956 2 Sheets-Sheet 2

INVENTOR.
JON LODE
BY
[signature]
Attorney.

2,854,632
Patented Sept. 30, 1958

1

2,854,632

PHASE SEQUENCE SEGREGATING NETWORK

Jon Lode, Vasteras, Sweden, assignor to Allmänna Svenska Elektriska Aktiebolaget, Vasteras, Sweden, a corporation of Sweden Application May 14, 1956, Serial No. 584,723

Claims priority, application Sweden May 28, 1955

6 Claims. (Cl. 324—108)

This invention relates to a phase sequence segregating network and to a means for detecting negative phase sequence current or positive phase sequence current in a three-phase-system. When the segregating network is influenced by the currents in at least two different phases of a three-phase network, it delivers between two output terminals a voltage, which is proportional to the current component with a certain phase sequence, but which is substantially independent of the current component with opposite phase sequence.

The simplest type of phase sequence segregating networks comprises two impedance elements which are influenced by different phase currents, and the vector sum of the voltages across the two impedance elements constitutes the output voltage of the segregating network. The impedance elements usually consist of a resistance in one phase and a resistance in series with a reactor in the other phase. By suitable dimensioning of the two impedances the output voltage may for instance be made zero for a pure positive phase sequence current at a certain frequency. The output voltage differs, however, from zero if the frequency deviates from the value for which the segregating network is constructed, even if the current in the three-phase network remains a pure positive phase sequence current. This frequency dependence restricts the application of this sort of segregating network, and, for detecting small unsymmetries in multiphase networks exposed to some percents frequency variations, complicated segregating networks have hitherto been necessary.

It is the main object of the invention to provide a phase sequence segregating network having a negligible frequency dependence and yet being simple and reasonable in cost.

It is another object of the invention to provide a phase sequence segregating network of this sort having a small power consumption and a high efficiency.

It is a further object of the invention to provide a phase sequence segregating network that is easy to adjust and is of reliable construction, and it is also among the objects of the invention to provide a phase sequence segregating network comprising only resistors and coils.

According to the invention a phase sequence segregating network having these desirable qualities comprises two impedance means being influenced by currents in different phases of a three-phase network. One of said impedance means consists of a resistor connected in series with a winding in a reactor, and the other consists of a resistor connected in parallel with a winding in another reactor, the output voltage from said segregating network being composed of the voltages over said two resistors and a voltage obtained from a secondary winding on said first mentioned reactor.

Figure 1:
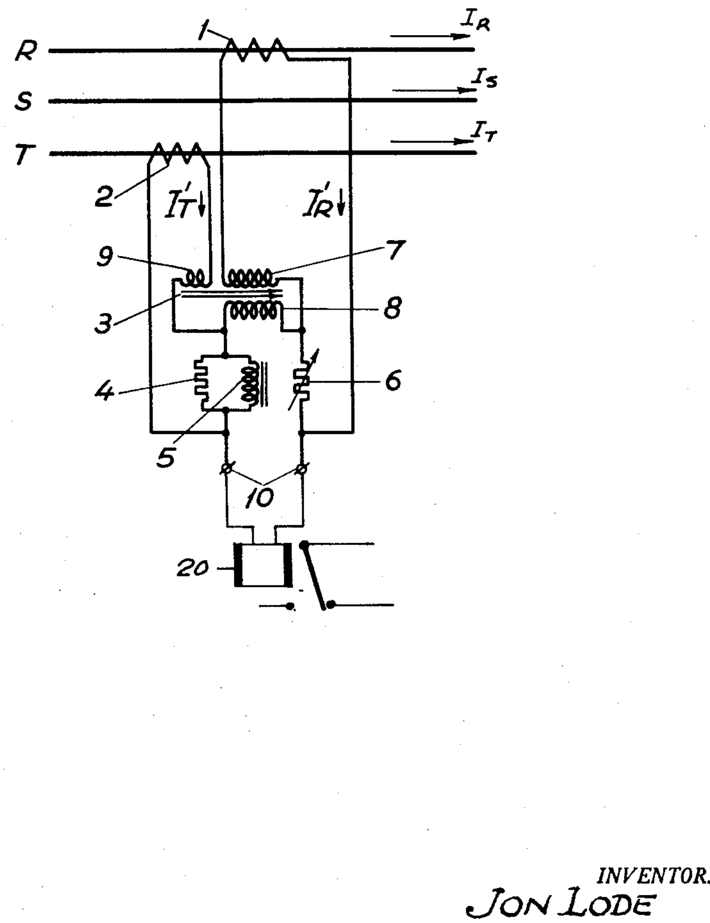
Figure 2:
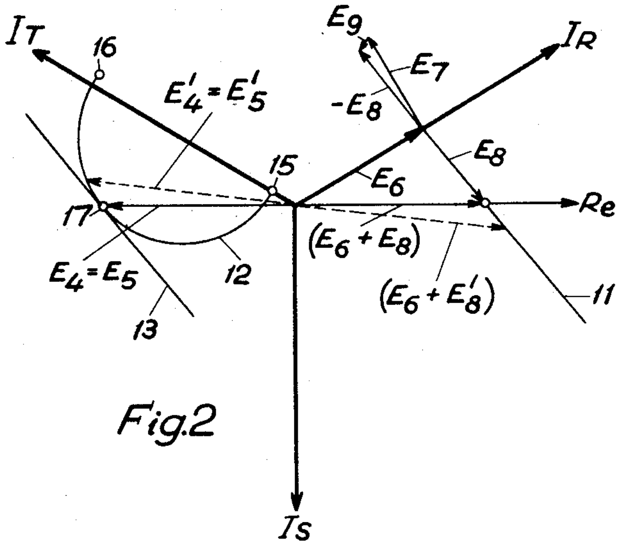
Figure 3:
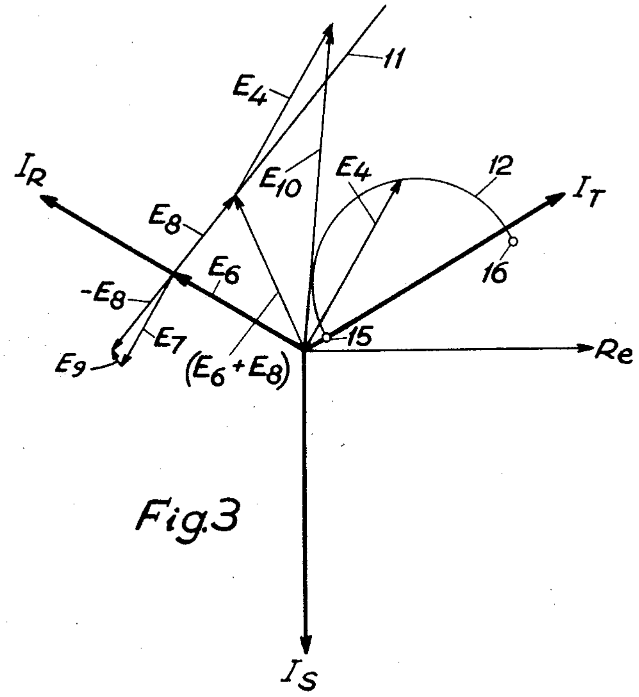

The function of the arrangement will now be described, reference being made to the accompanying drawing, in which Fig. 1 shows one form of a segregating network according to the invention arranged as a negative phase sequence segregating network, while Figs. 2 and 3 show vector diagrams for the voltages across the different elements of the segregating network at pure positive and negative phase sequence current.

2

In Fig. 1, RST designate the phases in a three-phase network, and 1 and 2 designate current transformers arranged in phase R and phase T respectively. The secondary current $I_T$ from the current transformer 2 in phase T traverses a winding 9 on a reactor 3 and an impedance means consisting of a resistor 4 in parallel with a reactor 5. The secondary current $I_R$ from the current transformer 1 in phase R traverses another impedance means consisting of a resistor 6 in series with a primary winding 7 on the reactor 3. A secondary winding 8 on the reactor 3 is in series with the resistors 4 and 6 connected to two terminals 10, serving as output terminals in the segregating network. The numbers of turns in the windings 7 and 8 are supposed to be approximately equal, and the number of turns in the winding 9 is small in comparison with the other two numbers of turns, and the voltage across the winding 8 is thus substantially equal in magnitude to the voltage across the winding 7.

In Fig. 2 a vector diagram is shown for the voltage over the different members of the segregating network according to Fig. 1, presuming that the segregating network is correctly adjusted as a negative phase sequence segregating network and is influenced by a pure positive phase sequence current RST.

In Fig. 2, the phase currents in the phases R and T are indicated by the vectors $I_R$ and $I_T$, and the voltage vectors in the segregating network are indicated by $E_4$, $E_5$ and so on, the indexes corresponding with the designations of the members in Fig. 1. When the frequency is varied, the end point of the voltage vector for the impedance element 4, 5 describes a semicircle 12, the extreme points 15 and 16 of which correspond to zero frequency and infinite frequency respectively. The ratio between the resistance 4 and the inductance 5 has been chosen so that the phase angle between current and voltage across the parallel circuit is 30° at nominal network frequency, and the voltage across this impedance element is represented by the vector $E_4$ at this frequency. The voltage across the resistor 6 is represented by the vector $E_6$, which is in phase agreement with the current $I_R$. The voltage across the winding 8 on the reactor 3 is composed of voltages which are induced from the windings 7 and 9, in Fig. 2 indicated by $E_7$ and $E_9$. The voltage $E_7$ is leading the current $I_R$ by 90° and the voltage $E_9$ is leading the current $I_T$ by 90°, when the iron losses of the reactor are neglected, and the resulting voltage is therefore leading the current $I_R$ by a little more than 90°. When the winding 8 is correctly poled, this voltage is, however, shifted 180°, so that the voltage which is series connected with the voltage $E_6$ lags the current $I_R$ by nearly 90°. When the resistor 6 and the inductance of the winding 7 on the reactor 3 have their correct values, the total voltage vector across the elements 6 and 8, $(E_6+E_8)$, at nominal network frequency equals the voltage vector $E_4$, but is in phase opposition, and the voltage between the terminals 10 thus will be zero in this case.

When the frequency is changed, the end point of the voltage vector $E_4$ is displaced along the semicircle 12, as mentioned before, while the voltage $(E_6+E_8)$ follows the straight line 11. As will be seen from the vector diagram, the angle between the straight line 11 and the current vector $I_R$ can be changed by changing the number of turns in the winding 9. In Fig. 2 the straight line 11 is supposed to be parallel to the tangent of the semicircle 12 in the working point 17. If the frequency increases, the voltage vector $E_4$ is transformed to the voltage vector $E_4'$ and at the same time the voltage vector $(E_6+E_8)$ is transformed to the voltage vector $(E_6+E_8')$, and it will be seen from the diagram that the two voltage vectors remain in phase opposition and substantially equal in magnitude. When the frequency decreases, the voltage vectors are displaced in the opposite direction along their loci, but they balance each other as before, and the output voltage thus remains substantially zero within a large frequency range.

In Fig. 3 is shown the vector diagram for the same segregating network when the current is a pure negative phase sequence current, which in practice means that the current vectors $I_R$ and $I_T$ are interchanged. The designations are the same as in Fig. 2 and the loci 11 and 12 have substantially the same position in relation to their respective current vectors as in the preceding figure. The only difference is that the straight line 11 forms another angle with the current vector $I_R$, because the phase shifting vector $E_9$ has a phase other than previously. It is evident from the vector diagram in Fig. 3 that the voltage $E_{10}$ between the terminals 10, now differs considerably from zero, but its magnitude is of course directly proportional to the negative phase sequence current, and a relay means 20 connected to said output terminals 10 may detect a predetermined amount of negative phase sequence current. As the output voltage in this case nearly equals the algebraic sum of the three vectors $E_4$, $E_6$ and $E_8$, the power consumption in the segregating network is reasonable in comparison to the power, which can be delivered to a load connected to the output terminals 10, and the efficiency of the segregating network is as good or better than any previously known segregating network of this sort.

As previously explained, the winding 9 on reactor 3 has for its sole purpose to shift the voltage vector $E_8$, so that the locus 11 becomes parallel to the tangent of the locus 12 in the working point at nominal frequency. It is, however, also possible to dispense with the winding 9 and instead to shift the working point on the locus 12, so that the tangent in the new working point becomes parallel to the fixed locus 11. The winding 9 on reactor 3 is thus not necessary for the operation of the segregating network, but the adjustment of the segregating network is simplified if the winding 8 is dimensioned as above described. The adjustment may for instance be performed through adjustment of the resistances 4 and 6 and the air gap in the reactor 3.

The described form of the invention is only intended as an illustration and many other forms are within the scope of the invention. For the function of the segregating network it is necessary that at least two of the phase currents of the network are measured, but of course it is insignificant which two are chosen.

I claim as my invention:

1. A phase sequence segregating network, comprising a first reactor having a primary winding and a secondary winding, a first impedance means consisting of a resistor connected in series with said primary winding on said first reactor, means for feeding a first current proportional to a first phase current in a multiphase network through said first impedance means, a second reactor having a primary winding, a second impedance means consisting of a resistor connected in parallel with said primary winding on said second reactor, means for feeding a second current proportional to a second phase current in said multiphase network through said second impedance means, and two output terminals, said secondary winding and said two resistors being connected in series between said two output terminals.

2. In a phase sequence segregating network according to claim 1, said first reactor having a third winding in addition to said primary winding and said secondary winding, and said third winding being connected in series with said second impedance means.

3. In a phase sequence segregating network according to claim 1, said resistor in said first impedance means being adjustable and said first reactor having an iron core provided with an adjustable air gap.

4. In a means for detecting negative phase sequence current in a multiphase network, a first current transformer and a second current transformer, said current transformers having secondary windings and being influenced by two different phase currents in said multiphase network, a first reactor having a primary winding and a secondary winding, a first resistor being connected in series with said primary winding on said first reactor and with the secondary winding on said first current transformer, a second reactor having a primary winding, a second resistor being connected in parallel with said primary winding on said second reactor, the parallel connection of said second resistor and said primary winding on said second reactor being connected in series with the secondary winding on said second current transformer, and a relay means responsive to an alternating voltage, said secondary winding on said first reactor, said two resistors and an excitation winding in said relay means being connected in series.

5. In a means according to claim 4, said first reactor having a third winding in addition to said primary winding and said secondary winding, said third winding being connected in series with the secondary winding in said current transformer.

6. In a means according to claim 4, said first resistor being adjustable, and said first reactor having an iron core provided with an adjustable air gap.

References Cited in the file of this patent

UNITED STATES PATENTS

| | | |
|---|---|---|
| 1,535,587 | Evans | Apr. 28, 1925 |
| 2,513,890 | Petzinger | July 4, 1950 |